(12) United States Patent
Thomas

(10) Patent No.: US 7,797,208 B2
(45) Date of Patent: Sep. 14, 2010

(54) PAY YOURSELF FIRST

(75) Inventor: Tracey R. Thomas, Boonton, NJ (US)

(73) Assignee: Consumer and Merchant Awareness Foundation, New York, NY (US)

( * ) Notice: Subject to any disclaimer, the term of this patent is extended or adjusted under 35 U.S.C. 154(b) by 791 days.

(21) Appl. No.: 10/709,703

(22) Filed: May 24, 2004

(65) Prior Publication Data

US 2005/0177501 A1 Aug. 11, 2005

Related U.S. Application Data

(60) Provisional application No. 60/542,716, filed on Feb. 6, 2004, provisional application No. 60/552,857, filed on Mar. 11, 2004.

(51) Int. Cl.
*G06Q 40/00* (2006.01)
(52) U.S. Cl. ...................................................... 705/35
(58) Field of Classification Search .............. 705/35–41
See application file for complete search history.

(56) References Cited

U.S. PATENT DOCUMENTS

| | | | |
|---|---|---|---|
| 5,319,542 A | 6/1994 | King et al. | |
| 5,659,165 A * | 8/1997 | Jennings et al. | 235/379 |
| 5,716,211 A | 2/1998 | Vetter | |
| 5,745,706 A | 4/1998 | Wolfberg et al. | |
| 5,875,437 A * | 2/1999 | Atkins | 705/40 |
| 5,914,472 A | 6/1999 | Foladare et al. | |
| 5,920,847 A | 7/1999 | Kolling et al. | |
| 5,953,710 A * | 9/1999 | Fleming | 705/38 |
| 5,956,700 A | 9/1999 | Landry | |
| 6,010,239 A | 1/2000 | Hardgrave | |
| 6,032,133 A | 2/2000 | Hilt et al. | |
| 6,105,865 A | 8/2000 | Hardesty | |
| 6,128,603 A | 10/2000 | Dent et al. | |
| 6,164,533 A | 12/2000 | Barton | |
| 6,289,322 B1 | 9/2001 | Kitchen et al. | |

(Continued)

FOREIGN PATENT DOCUMENTS

JP 8-235276 A 9/1996

(Continued)

OTHER PUBLICATIONS

Chevreau, Jonathan, 'Pay yourself first' still works:; Jan. 29, 2004, National Post, National Edition, pg. In.01.F.*

(Continued)

*Primary Examiner*—Jagdish N Patel
*Assistant Examiner*—Kevin Poe
(74) *Attorney, Agent, or Firm*—Snell & Wilmer L.L.P.

(57) ABSTRACT

The invention encourages users to not only pay themselves first, but to pay themselves first in the largest amounts possible, even if they are not able to fully pay outstanding debts. In general, the invention obtains information related to the user's income, income sources, user's debts (e.g., bills) and user's goals, then provides recommendations related to the prioritization of paying certain bills and the amount to pay for each bill based upon, for example, savings goals, minimum amounts due, due dates and available income. The invention also determines a payment hierarchy which includes transferring funds to the user's savings account prior to paying all or a portion of certain bills.

46 Claims, 2 Drawing Sheets

U.S. PATENT DOCUMENTS

| | | | |
|---|---|---|---|
| 6,298,334 B1 | 10/2001 | Burfield et al. | |
| 6,298,335 B1 | 10/2001 | Bernstein | |
| 6,347,305 B1 | 2/2002 | Watkins | |
| 6,363,362 B1 | 3/2002 | Burfield et al. | |
| 6,401,079 B1 | 6/2002 | Kahn et al. | |
| 6,408,284 B1 | 6/2002 | Hilt et al. | |
| 6,438,527 B1 | 8/2002 | Powar | |
| 6,578,015 B1 | 6/2003 | Haseltine et al. | |
| 6,594,640 B1 | 7/2003 | Postrel | |
| 6,601,761 B1 | 8/2003 | Katis | |
| 6,631,358 B1 | 10/2003 | Ogilvie | |
| 6,890,179 B2 * | 5/2005 | Rogan et al. | 434/107 |
| 6,907,403 B1 * | 6/2005 | Klein et al. | 705/36 R |
| 6,985,867 B1 * | 1/2006 | Pryor et al. | 705/1 |
| 7,089,208 B1 * | 8/2006 | Levchin et al. | 705/39 |
| 7,236,950 B2 * | 6/2007 | Savage et al. | 705/34 |
| 7,313,543 B1 | 12/2007 | Crane et al. | |
| 2001/0011240 A1 | 8/2001 | Wardin et al. | |
| 2001/0032182 A1 | 10/2001 | Kumar et al. | |
| 2001/0032183 A1 | 10/2001 | Landry | |
| 2001/0037295 A1 | 11/2001 | Olsen | |
| 2002/0026423 A1 * | 2/2002 | Maritzen et al. | 705/56 |
| 2002/0077978 A1 | 6/2002 | O'Leary et al. | |
| 2002/0082990 A1 | 6/2002 | Jones | |
| 2002/0087468 A1 | 7/2002 | Ganesan et al. | |
| 2002/0120513 A1 | 8/2002 | Webb et al. | |
| 2002/0123949 A1 * | 9/2002 | VanLeeuwen | 705/35 |
| 2002/0156710 A1 * | 10/2002 | Ryder | 705/35 |
| 2003/0018557 A1 * | 1/2003 | Gilbert et al. | 705/36 |
| 2003/0023549 A1 * | 1/2003 | Armes et al. | 705/40 |
| 2003/0069842 A1 | 4/2003 | Kight et al. | |
| 2003/0074311 A1 | 4/2003 | Saylors et al. | |
| 2003/0105689 A1 | 6/2003 | Chandak et al. | |
| 2003/0130948 A1 | 7/2003 | Algiene et al. | |
| 2003/0144938 A1 * | 7/2003 | Lahre et al. | 705/36 |
| 2003/0163425 A1 | 8/2003 | Cannon, Jr. | |
| 2003/0187762 A1 | 10/2003 | Coyle | |
| 2003/0208445 A1 | 11/2003 | Compiano | |
| 2003/0216996 A1 * | 11/2003 | Cummings et al. | 705/39 |
| 2004/0015438 A1 | 1/2004 | Compiano et al. | |
| 2004/0019560 A1 | 1/2004 | Evans et al. | |
| 2004/0035923 A1 | 2/2004 | Kahr | |
| 2004/0039692 A1 | 2/2004 | Shields et al. | |
| 2004/0049439 A1 | 3/2004 | Johnston et al. | |
| 2004/0111367 A1 | 6/2004 | Gallagher et al. | |
| 2004/0111370 A1 | 6/2004 | Saylors et al. | |
| 2004/0193491 A1 | 9/2004 | Davis | |
| 2005/0004856 A1 * | 1/2005 | Brose et al. | 705/35 |
| 2005/0044042 A1 * | 2/2005 | Mendiola et al. | 705/42 |
| 2005/0077348 A1 | 4/2005 | Hendrick | |
| 2005/0097034 A1 | 5/2005 | Loeger et al. | |
| 2005/0102209 A1 * | 5/2005 | Sagrillo et al. | 705/35 |
| 2005/0149436 A1 * | 7/2005 | Elterich | 705/39 |
| 2005/0177500 A1 * | 8/2005 | Thomas | 705/40 |
| 2005/0177503 A1 * | 8/2005 | Thomas | 705/40 |
| 2005/0228733 A1 * | 10/2005 | Bent et al. | 705/35 |
| 2006/0190372 A1 * | 8/2006 | Chhabra et al. | 705/35 |
| 2006/0212389 A2 * | 9/2006 | Bent et al. | 705/40 |
| 2007/0118476 A1 * | 5/2007 | Likourezos et al. | 705/44 |
| 2007/0162387 A1 * | 7/2007 | Cataline et al. | 705/40 |
| 2008/0005021 A1 * | 1/2008 | Brown et al. | 705/40 |

FOREIGN PATENT DOCUMENTS

| | | |
|---|---|---|
| JP | 2003-132224 A | 5/2003 |
| WO | 99/30261 | 6/1999 |
| WO | 01/39077 | 5/2001 |
| WO | 0139077 | 5/2001 |
| WO | 02/097561 | 12/2002 |

OTHER PUBLICATIONS

Jonathan Chevreau, 'Pay yourself first' still works, Jan. 29, 2004, National Post. p. IN.01.F.*

Chevreau, Jonathan, National Post dated Jan. 1, 2004, titled 'Pay Yourself First' Still Works.

Non-Final Rejection mailed Nov. 5, 2007 in U.S. Appl. No. 10/709,707.

Non-Final Rejection mailed Dec. 17, 2007 in U.S. Appl. No. 10/709,706.

Final Rejection mailed Apr. 24, 2008 in U.S. Appl. No. 10/709,707.

Final Rejection mailed May 5, 2008 in U.S. Appl. No. 10/709,706.

Non-Final Rejection mailed Jan. 5, 2009 in U.S. Appl. No. 10/709,706.

Non-Final Rejection mailed Jan. 26, 2009 in U.S. Appl. No. 10/709,707.

Non-Final Rejection mailed Feb. 27, 2009 in U.S. Appl. No. 10/710,779.

Final Rejection mailed Aug. 4, 2008 in U.S. Appl. No. 10/709,702.

Non-Final Rejection mailed Sep. 24, 2009 in U.S. Appl. No. 10/709,701.

Final Rejection mailed Oct. 1, 2009 in U.S. Appl. No. 10/709,706.

Final Rejection mailed Nov. 3, 2009 in U.S. Appl. No. 10/710,779.

Final Rejection mailed Nov. 24, 2009 in U.S. Appl. No. 10/709,707.

Advisory Action mailed Feb. 9, 2010 in U.S. Appl. No. 10/709,707.

Advisory Action mailed Feb. 19, 2010 in U.S. Appl. No. 10/709,706.

Advisory Action mailed Feb. 22, 2010 in U.S. Appl. No. 10/710,779.

Non-Final Rejection mailed Apr. 26, 2010 in U.S. Appl. No. 10/710,779.

Non-Final Rejection mailed May 12, 2010 in U.S. Appl. No. 10/709,702.

Notice of Allowance mailed May 14, 2010 in U.S. Appl. No. 10/709,701.

* cited by examiner

PAY YOURSELF FIRST

CROSS REFERENCE TO RELATED APPLICATIONS

This application claims priority to, and the benefit of, U.S. Provisional Application Ser. No. 60/542,716, entitled "PAY YOURSELF FIRST SYSTEM AND METHOD," filed Feb. 6, 2004, and U.S. Provisional Application Ser. No. 60/552,857, entitled "IMPROVED PAY YOURSELF FIRST SYSTEM AND METHOD," filed Mar. 11, 2004, which are both hereby incorporated by reference in their entirety.

FIELD OF INVENTION

This invention relates generally to money management, and more particularly, to the hierarchical distribution of income among a user's savings account and a user's debts.

BACKGROUND OF INVENTION

An increasing number of people have difficulty managing their income and debts as evidenced by an increase in bankruptcies, home foreclosures, excessive credit card balances, and other money mismanagement practices. Additionally, a larger number of people tend to live paycheck to paycheck, and unfortunately, an increasing number of consumer services take advantage of consumer's money mismanagement practices. For example, an increased number of financial products and services exist which put people in larger debt or require people to pay more bills including, for example, check cashing centers with large fees, home equity loans, interest free or payment free purchases for a certain number of months, cash advance offers, pawn shops, short-term cash loans with large interest rates, debt consolidation loans and early partial monies based upon the user assigning tax rebates.

Furthermore, due in part to the increased use of charge cards, payment plans, layaway plans, periodic payment plans, loans, mortgages and other services which are billed periodically, people are typically forced to manage numerous bills and other debts each month. Upon receiving a bill, many people pay the bill immediately or as soon as possible to avoid missing a payment and to avoid any late fees. Many people also usually pay bills immediately upon receipt in fear that their credit rating may be affected, fear that they may be sued, fear of late fees, discontinuance of service, a dislike of owing money, and/or a dislike of unresolved bills piled up in their homes. Moreover, many people will often use all of their income to pay bills first, spend all of their discretionary money, then attempt to save the remainder of the income, which is often little or no money. As such, many people are unable to save a sufficient amount of money. Accordingly, a system is needed to encourage and increase savings prior to paying all or a portion of debts, while reducing such bill payment fears and at least partially discouraging the attitude to pay the entire amount of bills or debts first.

Moreover, while automatic bill payment systems exist, the automatic bill payment systems typically require consumer input of a particular amount to be paid and a particular bill to be paid. However, the automatic bill payment systems do not include any hardware or software to consider user income, user income sources and user savings goals when determining bill payments. Additionally, because third party companies operate the automatic bill payment systems, the automatic bill payment systems cannot be sufficiently customized or altered to provide such features. Accordingly, a technical problem exists wherein the automatic bill payment systems lack certain needed features. As such, a need exists to develop complex hardware and software to analyze income sources and savings goals before transferring the consumer funds to an automatic bill payment system.

SUMMARY OF INVENTION

The present invention encourages users to not only pay themselves first, but to pay themselves first in the largest amounts possible, even if they are not able to fully pay outstanding debts. In general, the system obtains information related to the user's income, income sources, user's debts (e.g., bills) and user's goals. The system then provides recommendations related to the prioritization of paying certain bills and the amount to pay for each bill based upon, for example, savings goals, minimum amounts due, due dates and available income. The system and/or the user may then determine a payment hierarchy which includes transferring funds to the user's savings account prior to paying all or a portion of certain bills.

More particularly, the invention allocates income to a user savings account and to user debts by receiving user financial information, wherein the financial information includes, for example, user income information related to user income, user income source information related to user income sources, user debt information related to user debts and user goal information related to user goals; providing at least one recommendation, wherein the recommendation includes, for example, suggestions for minimizing user debt payments and maximizing user savings; establishing a payment hierarchy based at least in part on the recommendation, wherein the payment hierarchy includes at least a portion of a payment allocated to the user savings account and a portion allocated to the user debts; acquiring user income; and, transferring user income, based at least in part upon the payment hierarchy, to at least one of user savings account and user debts.

BRIEF DESCRIPTION OF DRAWINGS

The invention will hereinafter be described in conjunction with the appended drawing figures, wherein like numerals denote like elements, and.

DETAILED DESCRIPTION

Figure 1:
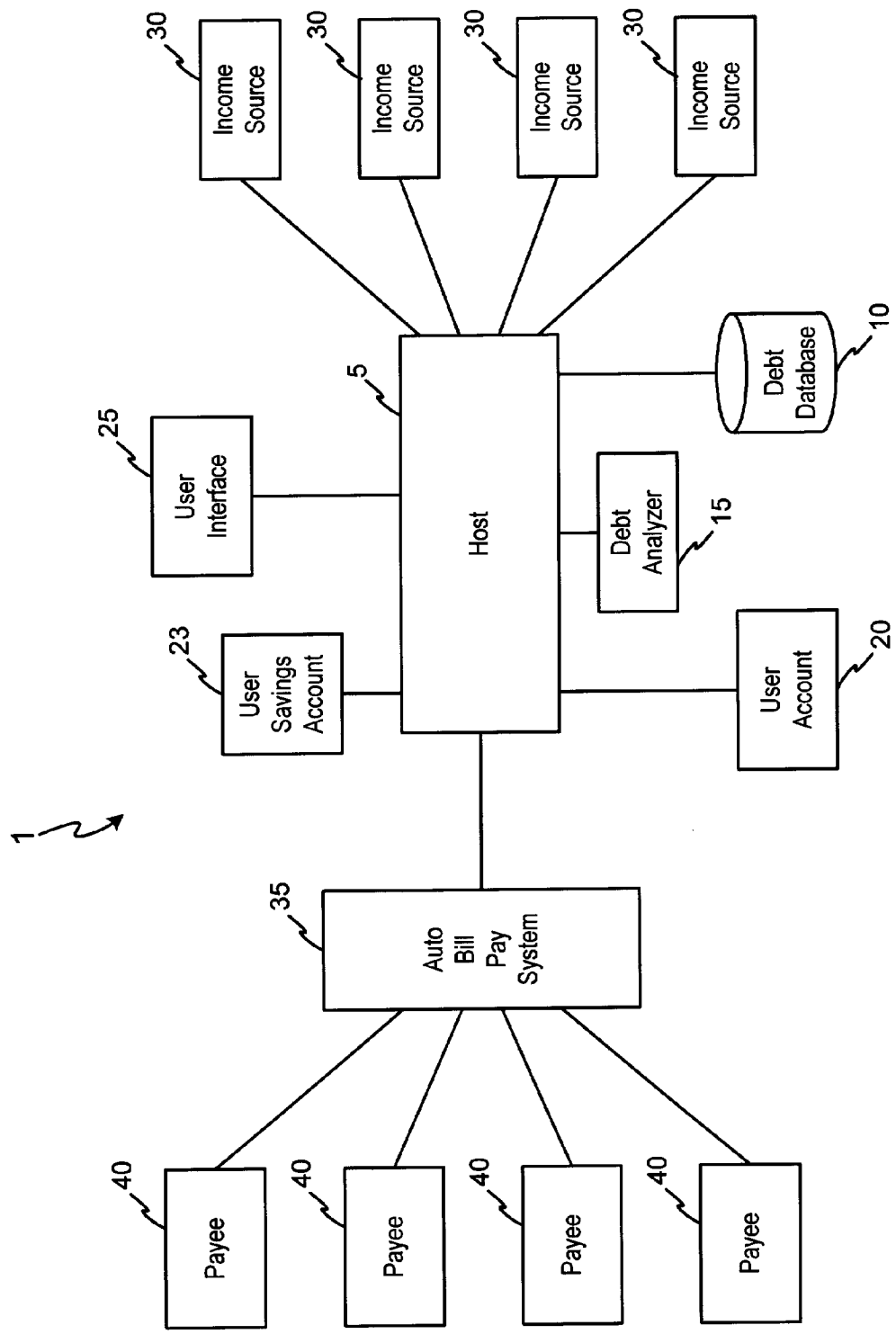
FIG. 1 is a block diagram showing an exemplary embodiment of a system in accordance with the present invention; and, FIG. 2 is a flow chart showing an exemplary embodiment of a method for implementing the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

In general, the invention includes a system and method which facilitates the transfer of all or any portion of user income to a user account 20 and user savings account 23 based upon a hierarchical based or rules based system. The invention also allocates and transfers a portion of the user income to other accounts (e.g., payee bills or debts) based upon other hierarchies and rules, wherein the host 5 may transfer a portion of the user income from user account 20 to a user savings account 23 ("pay yourself") first before paying all or a certain portion of the user debts. In one embodiment, the invention includes complex hardware and software to analyze income sources and savings goals before transferring the consumer income to an automatic bill payment system. As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The user income, as used herein, may include any monetary or non-monetary income, asset or benefit related to the user, wherein the income may be obtained from an income source of the user (e.g., employer) or any other third party. The user income may include paycheck, salary, bonuses, commissions, purchase rebate, tax rebates, property, goods, social security, welfare, alimony, child support, rental income, securities-related income, gambling winnings, credits, loyalty points, reward points, coupons, entry passes and/or the like.

User debts, as used herein, include any monetary or non-monetary liability of the user or any other third party (e.g., user may be obligated or desire to pay off the debt of a relative, company or associate). The debts may be related to bills (e.g., utilities, cable television, phone, etc), car payments, loans, mortgages, purchases, voluntary payments (e.g., charitable or religious donations), alimony, child support, payment plans, lines of credit, financial losses, gambling losses, responsibilities and/or the like.

An exemplary system 1 according to one embodiment, and as set forth in FIG. 1, may include one or more host 5, user account 20, user savings account 23, user interface 25, income source 30 and payee 40. The system may also include or interface with an automatic bill payment system 35. For the sake of brevity, conventional data net-working, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Moreover, one skilled in the art will appreciate that, for security reasons, any databases, systems, devices, servers or other components of the present invention may consist of any combination thereof at a single location or at multiple locations, wherein each database or system includes any of various suitable security features, such as, for example, firewalls, access codes, encryption, decryption, compression, decompression, and/or the like.

Host 5 may include any hardware and/or software suitably configured to facilitate management of user income and/or user income sources. Host 5 may interface, directly or indirectly, with user account 20, user interface 25, income sources 30, automatic bill payment system 35, and/or payees 40. Host 5 may acquire information, funds or any other data from income sources 30 and transfer the funds into user account 20. Host may also acquire information from payees 40 and/or transfer funds to payees 40 (e.g., directly or via automatic bill payment system 35). Host may also include debt analyzer 15 and debt database 10. Host 5 may also allow the user to track user spending, payments and income received. Host 5 may also allow the user to import such data from another system or database (e.g., security broker database, charge card database), for the purpose of helping the user to estimate income, bill amounts, the dates when such income will be received or when such bills will come due. Host 5 may also allow user to utilize user interface 25 to access not only the features of system 1, but also personal financial accounting system features and information. In this regard, the system may also be integrated with any personal financial or accounting system, such as Quicken or any financial advice software.

Debt database 10 may include any hardware and/or software suitably configured to facilitate storing debt information. The debt information may include, for example, payee account numbers, payee names, bill due dates, minimum payment information, penalty information, interest information, credit rating information, payee rules and restrictions, and/or the like. Debt analyzer 15 may include any hardware and/or software suitably configured to facilitate analysis of the debt information and/or to determine a suggested hierarchy of debts. The debt analyzer 15 may obtain information from a personal financial or accounting system in order to provide additional recommendations which conform at least partially to the suggestions or restrictions of the financial or accounting software.

User account 20 may include any hardware and/or software suitably configured to facilitate storing user income and/or user income information. The user income information may include, for example, income source data, date of deposit or receipt, amounts owed from particular income sources, amounts deposited in the user savings account 23, dates of deposits in user savings account 23 and/or the like.

User savings account 23 may include any hardware and/or software suitably configured to facilitate storing income, wherein the income may not have yet been allocated to payees 40. User savings account 23 may include, for example, any financial account (e.g., savings, checking, money market), loyalty account, security, financial transaction instrument (e.g., stored value card, charge card, smart card, transponder), negotiable instrument, coupon and/or the like. In an exemplary embodiment, the account does not easily allow for withdrawals (i.e., has no check-writing privileges, banking or checking card features which facilitate easy withdrawals).

User interface 25 may include any hardware and/or software suitably configured to facilitate input, receipt and/or review of any information related to system 1 or any information discussed herein. User interface 25 may include any device (e.g., personal computer) which communicates (in any manner discussed herein) with host 5 via any network discussed herein.

Automatic bill payment system 35 may include any hardware and/or software suitably configured to facilitate acquiring bill information and/or payment of bills. Automatic bill payment system 35 may include known bill payment systems such as, for example, the systems offered by Yahoo Bill Pay, Checkfree, PayBills, PayPal, etc. Automatic bill payment system 35 may facilitate the payment of bills on or near the due date. Because paying some bills past the due date may substantially affect the user's credit rating, system 1 may incorporate an on-line bill payment system 35 to mitigate the late payment risk. Accordingly, in one embodiment, the system includes an automatic bill payment system 35 or other on-line billing feature that allows the user to select bills to be paid on-line and the date in which the bills are to be paid.

Payees 40 may include one or more person or entity which is owed money. Payees 40 may provide or allow access to debt information from host 5 directly or via automatic bill payment system 35. Payee may also include, for example, one or more person, entity, organization, software, hardware, charity, utility, mortgage company and/or the like. Similarly, user may include, for example, one or more person, entity, company, charity, organization, software, hardware, and/or the like.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols" (1998); "Java 2 Complete", various authors, (Sybex 1999); Deborah Ray and Eric Ray, "Mastering HTML 4.0" (1997); and Loshin, "TCP/IP Clearly Explained" (1997) and David Gourley and Brian Totty, "HTTP, The Definitive Guide" (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods. See, e.g., Gilbert Held, "Understanding Data Communications" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise," (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

Each user, income source, host, payee or other participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the invention. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The computers may be interconnected via a second network, referred to as a payment network. The payment network which may be part of certain transactions represents existing proprietary networks that presently accommodate transactions for credit cards, debit cards, and other types of financial/banking cards. The payment net-work is a closed network that is assumed to be secure from eavesdroppers. Exemplary transaction networks may include the American Express®, VisaNet® and the Veriphone® networks.

An "account" or "account number", as used herein, may include any device, code, number, letter, symbol, digital certificate, smart chip, digital signal, analog signal, biometric or other identifier/indicia suitably configured to allow the user to access, interact with or communicate with the system such as, for example, one or more of an authorization/access code, personal identification number (PIN), Internet code, other identification code, and/or the like which may optionally be located on or associated with a rewards card, charge card, credit card, debit card, pre-paid card, telephone card, smart card, magnetic stripe card, bar code card, transponder, radio frequency card or an associated account. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identifies a particular merchant for purposes of card acceptance, account reconciliation, reporting, or the like.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 2:
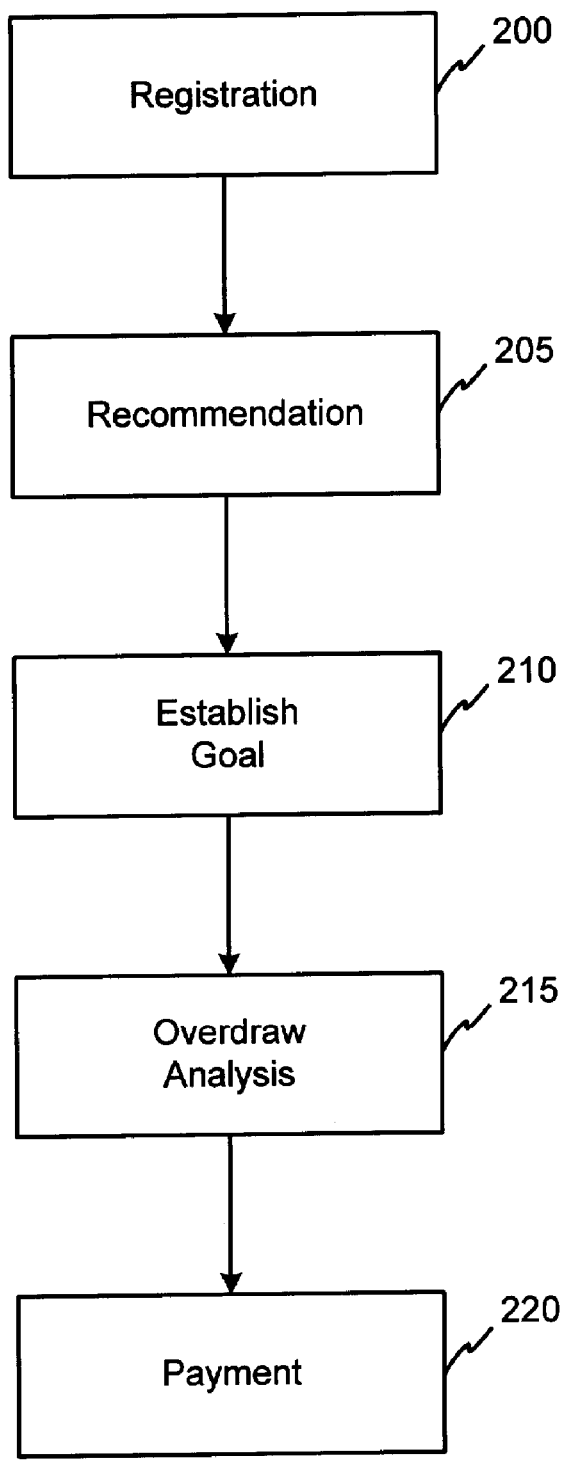

In one embodiment, the foregoing exemplary system may be used in the present invention to perform the following method. The exemplary method may include, as set forth in FIG. 2, a registration phase (step 200), a recommendation phase (step 205), a goal establishment phase (step 210), an overdraw analysis phase (step 215) and a payment phase (step 220).

The registration phase (step 200) may include a user providing and system receiving financial information. The user may provide the information via any network or communication system discussed herein. In one embodiment, host 5 provides a web page within a website which is hosted at a server, wherein the webpage facilitates obtaining personal financial information from the user by, for example, menu driven interactive procedures. The user may use user interface 25 to enter into a web page the requested financial information, wherein the financial information may include, for example, user income information, user income source information, user goal information, and user debt information.

The user income source information may include any information related to user income such as, for example, income source demographic data, income source routing data (e.g., to facilitate the funds being deposited within user account 20), amount of income during a particular timeframe (e.g., bi-monthly), bonus information (e.g., amount and time of year received), tax refund information, estimated commission information and/or the like. As set forth above, the user income may include any monetary or non-monetary income, asset or benefit related to the user, wherein the income may be obtained from an income source of the user (e.g., employer) or any other third party. The user income may include paycheck, salary, bonuses, commissions, purchase rebate, tax rebates, property, goods, social security, welfare, alimony, child support, rental income, securities-related income, gambling winnings, credits, loyalty points, reward points, coupons and/or the like. The user may also be requested to identify the days of the month in which such user income is received and the amounts of such income. If the user receives any or all income at random times (i.e. "not periodically"), then the user may estimate the amounts of such non-periodic income and indicate when such non-periodic income will be received. Host 5 may store the user income and user income source information in user account database 20.

The user income may also include additional funds submitted by the user or any other third party to system 1 in order to supplement user account 20 or user savings account 23. For example, the user may submit extra funds with a bill payment such as a single check or money transfer for both host charge card purchases and for deposit of money into user savings account 23. When the user payment is received by the host or charge card administrator, the payment processing system determines, based on the user goals, how each of the user's payments should be allocated between charge card payments and user savings account 23, namely through the use of a payment hierarchy which includes a predetermined set of allocation rules. The host or charge card administrator's payment processing system may then electronically forward the appropriate savings amount to user saving account 23 based upon another payment hierarchy related to the allocation of savings funds among savings, debts or investment products. For additional information related to submitting additional funds to the system, see for example, U.S. Ser. No. 09/415,632 filed on Oct. 12, 1999 by inventors Crane, et al., and entitled "SYSTEM AND METHOD FOR DIVIDING A REMITTANCE AND DISTRIBUTING A PORTION OF THE FUNDS TO MULTIPLE INVESTMENT PRODUCTS," which is hereby incorporated by reference.

The user goal information may include the amounts the user desires to pay himself, any other financial amount, limit, milestone, threshold, objective, aspiration and/or the like. For example, an amount of money needed for a vacation, a major purchase (e.g., house or car), holiday gifts, education, or retirement. The amount may be a one-time total amount, a pre-established amount for a limited time period or continuing time period, or a periodic amount which may result in a total savings by a certain date (e.g., $10,000 by June 15 of the following year for his daughter's wedding). The goal may also include a common goal for a group of people such as, for example, a group vacation, annual family function, charitable event or fundraiser and/or the like. The user goal may be entered by the user, randomly generated, based on a increasing or decreasing amount, created using a formula, selected by system 1 and/or selected by a third party (e.g., parent, financial advisor, etc). The system 1 may store the user goal information in user account database 20. The user may use the goal information for his own savings activities or the user may be provided the option to set up user savings account 23, wherein the system allocates a portion of the user income to user savings account 23. Because many individuals often think of saving money based on how much they will have after paying bills, the invention attempts to overcome this attitude, in an exemplary embodiment, by prompting the user for the user goal information before entering user debt information, so that the user is aggressive in the effort to pay himself first. Similarly, the user is prompted to enter the user goal information before entering income amounts, so that the user will be aggressive in setting the user goal information.

The user debt information includes any information related to user debts such as, for example, bills, name and address of payees 40, payee account routing information, amount of bills, minimum amounts due, due date, periodic payment plan information and/or the like. As set forth above, user debts may include any monetary or non-monetary liability of the user or any other third party. The debts may be related to bills, car payments, loans, mortgages, purchases, voluntary payments, alimony, child support, payment plans, lines of credit, financial losses, gambling losses, responsibilities and/or the like. The user debts may also include any amount that the user regularly pays as part of his living expenses and any other amounts that the user pays from time to time, or expects to pay. Host 5 may store the user debt information in debt database 10. Some bills of course are paid on a regular, periodic basis (monthly) and have predetermined amounts (e.g. a monthly auto payment of $300; a quarterly insurance payment of $200.00). Other bills arrive more randomly and/or in non-fixed amounts, but the bills may be anticipated with reasonable accuracy (e.g. health expenses, tax payments, auto and home maintenance, or unexpected events). For both periodic and non-periodic bills, the user may enter the day, the month and the due date which is the day he expects such bills to become due. The due date should not to be confused with the date the bill is received, because the due date represents the last possible day for bills to be paid.

The recommendation phase (step 205) may include, in one embodiment, debt analyzer 15 of system 1 reviewing the user debt information in debt database 10 to provide recommendations related to the prioritization or hierarchy for paying certain bills, the amount to pay for each bill and the user goal based upon, for example, user goal information, user debt information (e.g., minimum amounts due, due dates) and available user income. An exemplary embodiment includes periodic income (e.g., employment income) because it is often the easiest to base savings goals upon periodic income. For example, if the user is paid (after deductions) $500.00 a week from an employer, then the system 1 may suggest that the user pay himself some portion of that $500.00 (e.g., $100.00) before paying any bills. In another embodiment, the system may also incorporate randomly received income (e.g., a user may pay first to himself 10% of any tax refund or other non-routine income).

In addition to savings suggestions, the system may provide the user with recommendations for prioritizing payment of bills so that the user may determine when and how much to pay himself. For example, the system may recommend prioritizing bills to be paid in the following order from highest priority to lowest priority: (i) Bills that are for essentials (e.g., food, transportation to work and school, necessary job-related expenditures, necessary education-related expenditures); (ii) Bills that affect credit rating the most; (iii) Bills that have high penalties for late payments; and, (iv) Bills that are for non-essentials. The system may also provide recommendations for partial payments of bills, where the recommendations are directly related to helping the user meet the user goal. For example, if a user has an income of $500.00, and the user wants to save $400.00, but the user has a credit card bill with a minimum due of $50.00 and a total balance of $500.00, the program may recommend that the user submits a payment that allows the user to meet his user goal, while avoiding a large penalty (e.g., do not pay less than the minimum due, but not any larger amount).

In further embodiments, the system 1 may allow the user to select a passive "recommendation" mode or an active "automatic mode". In the passive recommendation mode, the debt analyzer 15 provides recommendations to the user such as, for example, the amounts to pay himself, when the payments to the user savings account 23 will be made, the order in which bills should be paid and the amounts to be paid toward the bills. In the automatic mode, the debt analyzer 15 provides recommendations to the user initially, but upon the user accepting or revising the recommendations, the system 1 automatically transfers the payment to the user savings account 23 and to the payment of bills. A partial automatic mode may also allow the user to choose actions to take place automatically, while other actions may require approval by the user after a recommendation is made by the program. For example, in the partial automatic mode, the user may allow the program to automatically direct a payment to the user savings account 23, while requiring the system to provide a recommendation and waiting for user approval before paying certain bills.

In another embodiment, the debt analyzer 15 may recommend that the user pay himself first, but only after funds become available in user account 20. In another embodiment, the system, on a certain date and/or upon a certain level of user income being transferred to user account 20, automatically transfers a payment from user account 20 to the user savings account 23. The system may also allow the user to set his own payment criteria (in addition to pre-established options) or override the order in which debt analyzer recommends that certain bills are to be paid. For example, the system may determine that bills for essentials (e.g., transportation) are given priority over bills that affect credit rating. The user, however, may determine that bills that affect his credit rating are more important than bills for transportation to work. If the user determines that he can walk to work instead of driving or using a mass mode of transportation, then the user may choose to provide bills that affect credit rating priority over such transportation bills. Thus, the system, based upon the user's criteria or override, may recommend paying bills in an order that gives priority to bills that affect credit rating over transportation bills. The system may also "learn" the user's preferences over time by analyzing the user's inputs and override suggestions such that debt analyzer 15 may provide recommendations that more appropriately conform to more common user inputs and override requests.

In another embodiment, system 1 may help the user determine if a goal is possible or realistic within a particular timeframe. For example, if the user wants to save $10,000 in one year to obtain a new car, the system (possibly in conjunction with financial management software) may analyze the user's income sources 30 and provide the recommendation that the user should change the goal completion date to two years or the user should obtain additional income sources. In this manner, the user is more likely to reach certain goals and continue to utilize system 1. Similarly, the system may help the user not only set current goals, but also to determine future goal amounts. For example, a user may set a goal during the current year to buy a new sports car, but in future years, the user's child may need to attend college or get married, so the user's savings goal may need to increase. As such, system 1 may calculate the amount of savings needed over various years to meet the current and future goals, wherein the savings may be calculated as an equal amount over the years or the savings may be calculated as an increasing amount to correspond to projected increased income over the years.

In an exemplary embodiment, the system may also provide probability modeling which facilitates financial advising and planning. A portfolio integration module may facilitate integration of at least one of a user's goals, assets, savings, and risk tolerance in analyzing and developing a customized strategy for financial planning of the user. A portfolio reconciler module may communicate with the portfolio integration module to facilitate comparison of the customized strategy to other strategies and projected financial decisions in order to further facilitate the user meeting the user goals. A stochastic modeling module in communication with the portfolio integration module and the portfolio reconciler module may use data from the portfolio integration module and/or the portfolio reconciler module in a stochastic modeling analysis to facilitate creation of a proposed situation portfolio for the user. The stochastic modeling module may use a synchronous stationary bootstrap method of statistical sampling to facilitate analysis of historical economic data in order to facilitate creation of the proposed situation portfolio. A simulator module in communication with the portfolio integration module and the stochastic modeling module may forecast the effects of changes to the probability modeling system and to monitor and test the system over a predetermined amount of time. For additional information related to financial management systems and methods, see for example, U.S. Pat. No. 5,819,263, issued on Oct. 6, 1998 by inventors Bromley, et al., and entitled "FINANCIAL PLANNING SYSTEM INCORPORATING RELATIONSHIP AND GROUP MANAGEMENT"; U.S. Pat. No. 6,430,542, issued on Aug. 6, 2002, and entitled "COMPUTER-IMPLEMENTED PROGRAM FOR FINANCIAL PLANNING AND ADVISE SYSTEM"; U.S. Ser. No. 10/210,827 entitled "SYSTEM AND METHOD FOR FINANCIAL PLANNING AND ADVICE," which wasfiled on Jul. 31, 2002; and, U.S. Ser. No. 09/712,743, entitled "SYSTEM AND METHOD FOR CREATING FINANCIAL ADVISE APPLICATIONS," filed Nov. 14, 2000, all of which are hereby incorporated by reference.

The goal establishment phase (step 210) may include the system and/or the user determining a payment hierarchy which may include transferring funds to the user's savings account 23 prior to paying all or a portion of certain bills. In this regard, the user determines "when" to pay himself based on the suggested recommendations and ranking. Using the example hierarchy above, one user may choose to transfer funds to user savings account 23 after paying bills that affect credit rating, but before bills with high penalties for late payment. However, another user may receive a similar recommended hierarchy list and request that the system transfer funds to user savings account 23 before paying bills in any of the categories set forth in the hierarchy listing.

The system may also not only pay (or encourage the user to pay) the user first (or in a priority position), but the system may transfer funds to the user savings account 23 first in the largest amounts possible. For example, if the user receives an electric bill on the fifteenth of the month that is not due until the first of the next month, the system may prompt the user for the due date and the system may recommend that the user to pay the bill on the due date and not before the due date. Additionally, if the user gets paid on the fifteenth of the month, the system recommends that the user pay himself first, leaving enough money to pay bills later, including the electric bill that is due on the first of the month. After the user pays himself, he can also budget discretionary money for entertainment purposes, dining out, etc. A responsible user is not likely to exceed his budget for discretionary money when he knows that bills are due that must be paid. Moreover, if the user exceeds the discretionary amount and cannot pay bills, then the user has already at least paid the most important entity first, namely himself.

In order for the user to meet a particular savings goal while the user continues to spend money, the system may be configured to transfer a certain amount of any user transaction amount to user savings account 23. In one embodiment, the user or system may set a particular dollar amount, percentage of purchase amount, number of transactions, total dollar amount spent or any other portion which is calculated based upon user transactions or the transaction amounts. For example, the system may obtain data from the user's transaction instrument account such that every time the user purchases an item which costs over $100, the system may transfer $5 of the user's income from user account 20 to the user savings account 23. In another example, the system may transfer 5% of the total value of all purchases during the next five months to user savings account 23. In these embodiments, the more a user spends on purchases, the more the user may save. Similarly, the system may analyze loyalty point accumulation and transfer loyalty points to a savings account based upon a pre-determined formula.

With respect to loyalty points, the system may incorporate loyalty points into any part of the process and provide the loyalty points to one or more participants in the process (e.g., user, payee, income source). As used herein, loyalty points may include any incentive which may or may not include points such as, for example, coupons, rewards, preferential services, preferential rates, prizes, vacations, entertainment packages and/or the like. In one embodiment, the system may provide loyalty points for every dollar that the user saves in savings account 23. The system may also encourage savings and discourage full payment of bills by providing loyalty points for not paying the full amount of a bill. The system may also provide a larger amount of loyalty points upon reaching a goal or upon reaching certain milestones toward the goal. The system may also provide extra loyalty points if the user allows the system to automatically transfer funds to savings account 23 without the user's prior approval. If user is utilizing the savings account to save money for a future gift or to provide a future donation to a charity, the system may allow the user to use loyalty points to pay for any portion of the gift or to supplement the charitable donation. The system may also acquire information related to user loyalty points (e.g., from system 1 (wherein the points were earned in system 1) or from a third party loyalty system), convert the loyalty points to a currency value and apply the currency value to user savings account 23 or payees 40 (e.g., user debts).

In still another embodiment, a government entity, an affiliate or sponsoring entity may provide loyalty points, preferred rates or rewards for increased savings. For example, user savings account 23 may be maintained at a bank such that the bank may desire to also encourage increased savings. In this regard, the bank may provide the user with loyalty points, higher interest rates, or prizes based upon the number of transfers or dollar amount of each transfer to the user savings account 23, the total amount in user savings account 23 during a certain time period and/or the like. For additional information related to loyalty systems, see for example, U.S. Ser. No. 10/010,947 entitled "SYSTEM AND METHOD FOR NETWORKED LOYALTY PROGRAM," which was filed on Nov. 6, 2001, and U.S. Ser. No. 09/834,478 entitled "A SYSTEM AND METHOD FOR USING LOYALTY POINTS," which was filed on Apr. 13, 2001, which are hereby incorporated by reference.

While the present invention may be described as transferring funds to user savings account 23 first before other user debts, the invention also contemplates transferring funds to the user savings account 23 at any predetermined time, interval or random period and the invention also contemplates transferring funds to the user savings account 23 before, during or after paying certain debts. For example, the system may allow the user to identify bills that are to be paid before the system transfers funds to the user savings account 23 and to identify bills to paid after the system transfers funds to the user savings account 23. The invention may also include exceptions to self payment first which may be determined by the user, a government entity or any other entity or person. The exceptions may include, for example, child support must always be paid first, then the user may decide on other "first" payment options. The invention may also allow the user to identify a priority for bills to be paid and/or any predetermined amount or percentage of each bill to pay.

During the overdraw analysis phase (step 215), prior to transferring the user income, host 5 may analyze the balance of funds in the user account 20 to determine if sufficient funds exist for paying the user savings account 23 and the bills according to the selected payment hierarchy. In one embodiment, because bills may vary from month to month, as the user enters bills to be paid, the program (e.g., in real-time) automatically performs a calculation to determine if the bills can be paid without overdrawing or exceeding the balance in the user account 20. If insufficient funds exist, system 1 may notify the user to readjust the payment hierarchy or the system may automatically adjust the payment hierarchy based upon pre-established rules. The system may notify the user of any overdraw issues via any communication system or network discussed herein.

During payment phase (step 220), if sufficient funds exist, system 1 transfers a predetermined amount of funds from user account 20 to user savings account 23, then to payees 40. In one embodiment, host 5 may transfer funds and/or payee information to automatic bill payment system 35 such that automatic bill payment system 35 allocates funds pursuant to pre-existing rules or auto bill pay procedures. Host 5 may provide instructions to automatic bill payment system 35 in such a way that automatic bill payment system 35 allocates consumer income to payees 40 according to the established hierarchy. For example, host 5 may provide automatic bill payment system 35 with the approval for payment of a bill for a necessity, then host 5 may wait until user savings account 23 reaches a pre-established level before providing another payment instruction to automatic bill payment system 35. In another embodiment, automatic bill payment system 35 may accept hierarchy or other instructions from system 1 and automatically allocate payments according to the hierarchy.

Transferring funds, or any similar phrase used herein, may include transferring all or any portion of funds, directly or indirectly, in any manner (e.g., electronic transfer, wire, etc). In one embodiment, the "transfer" may include, for example, encouraging the user to transfer funds, encouraging the user to select a particular transfer of funds by the system, providing a negotiable instrument (e.g., check) to the user (or to a selected person or entity), transferring funds to a charity or other entity (or dividing the funds between multiple charities), withdrawing funds from one account and depositing funds in another account, providing cash, transferring funds to any financial instrument discussed herein or known in the art (e.g., account, account number, stored value card, gift card, charge card credit, etc), sending the financial instrument to the user at predetermined intervals (e.g., monthly or when the account reaches a pre-determined amount), placing the selected funds in a pooled account with other family members (e.g., to save for a home improvement project), placing the selected funds in a pooled account with other friends (e.g., to save for a group vacation), and/or the like. The invention contemplates automatically receiving user income from income sources 30, automatically transferring funds to user and/or user savings account 23 and automatically transferring funds to payees 40; however, the invention also contemplates providing recommendations to user and allowing the user to obtain information, send information, or transfer the user's own funds manually or via a third party system.

The funds may be transferred periodically to user savings account 23, and in an exemplary embodiment, the user income may be periodically donated to a charity. For more information and details related to periodic transfers, donation systems and methods, see for example, U.S. Ser. No. 10/707,715, filed on Jan. 6, 2004, by inventors Aviles, et al., and entitled "Donation System and Method", which is hereby incorporated by reference.

In another embodiment, a stored value or gift card may be used to assist in the budgeting process and to meet the user goal. For example, the user may obtain an American Express Travel Funds Card that is automatically loaded by the system with the funds that user needs to pay bills. In an exemplary embodiment, the funds desired to meet the user's goal are first sent to a user savings account 23. After the user "pays himself" and the system receives the funds in the user savings account 23, the system may then take steps (or allow the user to take steps) to load or re-load the stored value card (i.e. the TravelFunds card).

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. Further, no element described herein is required for the practice of the invention unless expressly described as "essential" or "critical".

The invention claimed is:

1. A method of allocating user income to a user savings account of a user and to payees, said method including:
    receiving, by said computer-based system for maximizing savings, user financial information, wherein said user financial information comprises user savings goal information, user debt information and user income information;
    determining, by said computer-based system and based upon said user savings goal information and said user income information, a savings amount to be transferred from said user income to a user savings account, wherein said savings amount is at least a portion of user income;
    analyzing, by said computer-based system, said user debt information to determine a plurality of outstanding debt payments;
    determining, by said computer-based system, a plurality of penalties by analyzing, for each of said plurality of outstanding debt payments, a penalty associated with at least one of a payment amount and a payment timing;
    determining, by said computer-based system and in response to said savings amount to be transferred from said user income to said user savings account, a payment hierarchy based upon said savings amount, said plurality of penalties and at least one of said payment information, said user savings goal information and said user income information, wherein said payment hierarchy minimizes said plurality of penalties.

2. The method of claim 1, further including transferring, based at least in part upon the payment hierarchy, at least a portion of the user income to a payee associated with a first debt, wherein at least a portion of the plurality of debt payments comprise the first debt.

3. The method of claim 1, further including analyzing a balance of funds based upon said user income information and allowing transfer of said user savings amount in response to confirmation of sufficient funds.

4. The method of claim 1, further including analyzing a balance of funds based upon said user income information and disallowing transfer of said user savings amount in response to confirmation of insufficient funds.

5. The method of claim 1, further including analyzing a balance of funds based upon said user income information and, upon confirmation of insufficient funds, at least one of requesting said user to modify said payment hierarchy, suggesting modifications to said payment hierarchy and automatically modifying said payment hierarchy.

6. The method of claim 1, further including notifying at least one of said user, payee and third party regarding at least one of said determining steps.

7. The method of claim 2, further including notifying at least one of said user, said payee and a third party prior to at least one of transferring said savings amount and said transferring to said payee.

8. The method of claim 7, further including obtaining authorization from at least one of said user, payee and third party prior to allowing a transfer.

9. The method of claim 1, further including providing a recommendation including suggestions for minimizing user debt payments and maximizing user savings, wherein said recommendation is generated by said computer-based system, and providing a user interface configured to allow said user to view at least one of said recommendations, said payment hierarchy and transfer information.

10. The method of claim 1, further including providing statements to said user, wherein said statements include at least one of user savings account balance, user savings account deposits and user debt payments.

11. The method of claim 1, further including receiving at least one of pre-approval of all transfers and approval of each transfer.

12. The method of claim 1, further including tracking at least one of said user income, user savings goal information and transfers of user income.

13. The method of claim 9, further including revising said user savings goal information based in part on said recommendation.

14. The method of claim 1, further including analyzing user savings goal information based upon at least one of user income information, user debt information and financial planning information.

15. The method of claim 1, further including analyzing user savings goal information and providing suggested revisions to said goal information.

16. The method of claim 1, further including analyzing user savings goal information using probability modeling.

17. The method of claim 1, further including analyzing user savings goal information using probability modeling, wherein said probability modeling includes forecasting, monitoring, simulating, designing and testing.

18. The method of claim 1, wherein said receiving user financial information includes receiving user financial information from at least one of said user and a third party database.

19. The method of claim 1, wherein said receiving user financial information includes receiving said user income and depositing user income in a user account.

20. The method of claim 1, wherein said receiving user financial information includes receiving said user income from at least one of said user and a user income source.

21. The method of claim 1, wherein said receiving user financial information includes receiving said user financial information via webpage entries.

22. The method of claim 1, wherein said receiving user financial information includes receiving said user financial information via a menu driven interactive procedure.

23. The method of claim 9, wherein said providing a recommendation includes providing a recommendation which includes at least one of prioritizing payment of bills, partial payment of bills, determining when to pay a bill and determining an amount to pay for a bill.

24. The method of claim 9, wherein said step of providing a recommendation includes providing a recommendation based upon at least one of bill priority information, said user savings goal information, said user debt information, minimum amounts due, penalties, interest rates, due dates, available user income, user override selection and user historic selections.

25. The method of claim 1, wherein said establishing said payment hierarchy includes at least one of said user, guardian, government entity and third party establishing at least a portion of said payment hierarchy.

26. The method of claim 1, wherein said establishing said payment hierarchy includes providing a capability to alter said payment hierarchy.

27. The method of claim 1, wherein said establishing said payment hierarchy includes pre-established hierarchy requirements.

28. The method of claim 1, wherein said establishing said payment hierarchy includes establishing said payment hierarchy to include rules related to the amount of a bill to be paid.

29. The method of claim 1, further comprising acquiring user income including receiving a combined remittance which includes a debt payment and a savings amount.

30. The method of claim 1, further comprising acquiring user income including receiving a combined remittance which includes a debt payment and a savings amount, applying hierarchy rules to said combined remittance to determine a portion to be allocated to said user debts and a portion to be allocated to said user savings account, wherein said hierarchy rules are associated with said payment hierarchy.

31. The method of claim 1, further comprising acquiring said user income including allowing said user to transfer said user income.

32. The method of claim 1, wherein said user income includes at least one of monetary income, non-monetary income, asset, benefit, paycheck, salary, bonuses, commissions, purchase rebate, tax rebates, property, goods, social security, welfare, alimony, child support, rental income, securities-related income, gambling winnings, credits, loyalty points, reward points, coupons, and entry passes.

33. The method of claim 1, wherein said user income is obtained from at least one of said user and a third party.

34. The method of claim 1, wherein said user income information includes at least one of income source demographic data, income amount, days of month when income received, date when receive income, income source routing data, amount of income during a particular timeframe, bonus information, tax refund information, estimated commission information, estimate of the amounts of non-periodic income and dates when non-periodic income will be received.

35. The method of claim 1, wherein said plurality of outstanding debt payments include at least one of monetary liability, non-monetary liability, bills, car payments, loans, mortgages, purchases, voluntary payments, alimony, child support, payment plans, lines of credit, financial losses, gambling losses, and responsibilities.

36. The method of claim 1, wherein any of a plurality of outstanding debt information includes at least one of bill information, name and address of payees, payee account routing information, amount of bills, minimum amounts due, due date, and periodic payment plan information.

37. The method of claim 1, wherein any of said plurality of outstanding debt payments may be owed by at least one of said user and a third party.

38. The method of claim 1, wherein said user savings goal information includes at least one of amounts the user desires to pay himself, a financial amount, a limit, milestone, threshold, objective, aspiration, amount of money needed for a vacation, a major purchase, holiday gifts, education, retirement, a common goal for a group.

39. The method of claim 1, wherein said user savings goal information includes at least one of a one-time total amount, a pre-established amount for a limited time period, a pre-established amount for a continuing time period, a periodic amount which results in a total savings by a certain date, increasing amount, and decreasing amount.

40. The method of claim 1, wherein said user savings goal information is created by at least one of user entry, random generation, a formula, system selection and a third party.

41. The method of claim 1, wherein said user savings goal information is entered before at least one of entering user debt information and entering income amounts.

42. The method of claim 1, wherein said user financial information includes at least one of income source data, date of income deposit, date of income receipt, amounts owed from particular income sources, amounts deposited in the user savings account, and dates of deposits in user savings account.

43. The method of claim 1, wherein said user savings account includes at least one of a financial account, savings account, checking account, money market account, loyalty account, a security, a financial transaction instrument, stored value card, charge card, smart card, transponder, negotiable instrument, and coupon.

44. The method of claim 1, wherein said user savings account restricts check-writing privileges, withdrawals, loans, and purchases.

45. A system for maximizing savings comprising:
 a network interface communicating with a memory, said network interface configured to receive user financial information, wherein said user financial information comprises user savings goal information, user debt information and user income information; said memory communicating with a processor; and said processor, when executing a computer program, is configured to:
 receive user financial information, wherein said user financial information comprises user savings goal information, user debt information and user income information;
 determine, based upon said user savings goal information and said user income information, a savings amount to be transferred from said user income to a user savings account, wherein said savings amount is at least a portion of user income;
 analyze said user debt information to determine a plurality of outstanding debt payments;

determine a plurality of penalties by analyzing, for each of said plurality of outstanding debt payments, a penalty associated with at least one of a payment amount and a payment timing;

determine, in response to said savings amount to be transferred from said user income to the user said savings account, a payment hierarchy based upon said savings amount, said plurality of penalties and at least one of said payment information, said user savings goal information and said user income information, wherein said payment hierarchy minimizes said plurality of penalties.

46. A tangible computer-readable medium having computer-executable instructions stored thereon that, if executed by a computer-based system for maximizing savings, cause the computer to perform operations comprising:

receiving, by said computer-based system for maximizing savings, user financial information, wherein said user financial information comprises user savings goal information, user debt information and user income information;

determining, by said computer-based system and based upon said user savings goal information and said user income information, a savings amount to be transferred from said user income to a user savings account, wherein said savings amount is at least a portion of user income;

analyzing, by said computer-based system, said user debt information to determine a plurality of outstanding debt payments;

determining, by said computer-based system, a plurality of penalties by analyzing, for each of said plurality of outstanding debt payments, a penalty associated with at least one of a payment amount and a payment timing;

determining, by said computer-based system and in response to said savings amount to be transferred from said user income to the said user savings account, a payment hierarchy based upon said savings amount, said plurality of penalties and at least one of said payment information, said user savings goal information and said user income information, wherein said payment hierarchy minimizes said plurality of penalties.

* * * * *